US011111858B2

(12) United States Patent
Miller et al.

(10) Patent No.: US 11,111,858 B2
(45) Date of Patent: Sep. 7, 2021

(54) COOL CORE GAS TURBINE ENGINE (71) Applicant: General Electric Company, Schenectady, NY (US)

(72) Inventors: Brandon Wayne Miller, Liberty Township, OH (US); Randy M. Vondrell, Cincinnati, OH (US); Jeffrey Donald Clements, Mason, OH (US); Kurt David Murrow, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/417,710

(22) Filed: Jan. 27, 2017

(65) Prior Publication Data

US 2018/0355804 A1 Dec. 13, 2018

(51) Int. Cl.
*F02C 9/00* (2006.01)
*F02C 3/04* (2006.01)
(Continued)

(52) U.S. Cl.
CPC .............. *F02C 9/00* (2013.01); *F01D 5/147* (2013.01); *F01D 5/284* (2013.01); *F01D 9/04* (2013.01); *F01D 9/041* (2013.01); *F02C 3/04* (2013.01); *F02C 7/141* (2013.01); *F02C 7/18* (2013.01); *F02C 9/18* (2013.01); *F02K 3/06* (2013.01); *F05D 2220/323* (2013.01); *F05D 2220/3212* (2013.01); *F05D 2240/128* (2013.01); *F05D 2240/24* (2013.01); *F05D 2270/02* (2013.01); *F05D 2300/13* (2013.01); *F05D 2300/6033* (2013.01); *Y02T 50/60* (2013.01)

(58) Field of Classification Search
CPC ...... F02C 9/00; F02C 9/18; F02C 3/04; F02C 7/141; F02C 7/18; F01D 5/147; F01D 5/284; F01D 9/04; F01D 9/041; F02K 3/06
See application file for complete search history.

(56) References Cited

U.S. PATENT DOCUMENTS 3,842,595 A 10/1974 Smith et al.
4,055,997 A 11/1977 Kniat
(Continued)

FOREIGN PATENT DOCUMENTS

CN 105221262 A 1/2016
EP 2466074 6/2012
(Continued)

OTHER PUBLICATIONS

Pratt & Whitney, PurePower Engine Family Specs Chart, http://www.pw.utc.com/Content/PurePowerPW1000G_Engine/pdf/B-11_PurePowerEngineFamily_SpecsChart.pdf.
(Continued)

*Primary Examiner* — Craig Kim
(74) *Attorney, Agent, or Firm* — Dority & Manning, P.A.

(57) ABSTRACT

A gas turbine engine includes a compressor section defining a compressor exit temperature, T3. The gas turbine engine also includes a combustion section and a turbine section, with the turbine section defining a turbine inlet temperature, T4. A ratio, T4:T3, of the turbine inlet temperature, T4, to compressor exit temperature, T3, during operation of the gas turbine engine at a rated speed is less than or equal to 1.85.

18 Claims, 6 Drawing Sheets

(51) Int. Cl.

| | | |
|---|---|---|
| F02K 3/06 | (2006.01) | |
| F01D 5/28 | (2006.01) | |
| F02C 9/18 | (2006.01) | |
| F02C 7/141 | (2006.01) | |
| F01D 9/04 | (2006.01) | |
| F02C 7/18 | (2006.01) | |
| F01D 5/14 | (2006.01) | |

(56) References Cited

U.S. PATENT DOCUMENTS

| | | | | |
|---|---|---|---|---|
| 4,096,296 | A * | 6/1978 | Galmiche | C23C 10/58 |
| | | | | 148/277 |
| 4,424,667 | A | 1/1984 | Fanning | |
| 4,686,823 | A | 8/1987 | Coburn et al. | |
| 5,207,064 | A | 5/1993 | Ciokajlo et al. | |
| 5,257,903 | A * | 11/1993 | Allmon | F01D 25/18 |
| | | | | 415/169.1 |
| 5,392,614 | A * | 2/1995 | Coffinberry | F02C 7/12 |
| | | | | 60/806 |
| 5,406,787 | A | 4/1995 | Terrier | |
| 5,465,571 | A | 11/1995 | Clark | |
| 5,630,700 | A | 5/1997 | Olsen et al. | |
| 6,619,030 | B1 | 9/2003 | Seda et al. | |
| 6,893,214 | B2 | 5/2005 | Alford et al. | |
| 6,991,427 | B2 | 1/2006 | Scott | |
| 7,048,509 | B2 | 5/2006 | Tominaga et al. | |
| 7,062,920 | B2 | 6/2006 | McMasters et al. | |
| 7,186,078 | B2 | 3/2007 | Tanaka | |
| 7,249,462 | B2 | 7/2007 | Aumont et al. | |
| 7,329,087 | B2 | 2/2008 | Cairo et al. | |
| 7,445,425 | B2 | 11/2008 | Ferra et al. | |
| 7,464,554 | B2 | 12/2008 | Cheung et al. | |
| 7,600,368 | B2 | 10/2009 | Lockwood, Jr. | |
| 7,950,234 | B2 | 5/2011 | Radonovich et al. | |
| 8,141,371 | B1 | 3/2012 | Habarou et al. | |
| 8,175,796 | B1 | 5/2012 | Nemet et al. | |
| 8,240,980 | B1 | 8/2012 | Liang | |
| 8,246,305 | B2 | 8/2012 | Lecuyer et al. | |
| 8,753,073 | B2 | 6/2014 | Albers et al. | |
| 8,756,935 | B2 | 6/2014 | Duval et al. | |
| 8,763,406 | B2 | 7/2014 | Pieussergues et al. | |
| 8,776,525 | B2 | 7/2014 | Oechsle | |
| 8,887,487 | B2 | 11/2014 | Kupratis et al. | |
| 8,905,711 | B2 | 12/2014 | Suciu et al. | |
| 8,943,835 | B2 | 2/2015 | Corsmeier et al. | |
| 9,039,364 | B2 | 5/2015 | Alvanos et al. | |
| 9,169,736 | B2 | 10/2015 | Hayford et al. | |
| 9,255,487 | B2 | 2/2016 | Mayer et al. | |
| 2002/0134070 | A1 | 9/2002 | Orlando et al. | |
| 2005/0281307 | A1 * | 12/2005 | Emanuel | H01S 3/0953 |
| | | | | 372/58 |
| 2010/0162724 | A1 * | 7/2010 | Myers | F23R 3/26 |
| | | | | 60/794 |
| 2010/0194179 | A1 | 8/2010 | Waltz | |
| 2010/0286889 | A1 * | 11/2010 | Childers | F02C 6/08 |
| | | | | 701/100 |
| 2010/0326078 | A1 | 12/2010 | Pieussergues et al. | |
| 2011/0236200 | A1 | 9/2011 | Grover et al. | |
| 2011/0271684 | A1 | 11/2011 | Corsmeier et al. | |
| 2013/0000324 | A1 | 1/2013 | Alvanos et al. | |
| 2013/0259668 | A1 | 10/2013 | Myoren et al. | |
| 2014/0026580 | A1 | 1/2014 | Pardington et al. | |
| 2014/0157754 | A1 * | 6/2014 | Hasel | F02C 3/107 |
| | | | | 60/226.1 |
| 2014/0165581 | A1 * | 6/2014 | Terry | F02C 9/00 |
| | | | | 60/772 |
| 2014/0271144 | A1 | 9/2014 | Landwehr et al. | |
| 2014/0363276 | A1 | 12/2014 | Vetters et al. | |
| 2015/0064018 | A1 * | 3/2015 | Ahmad | F01D 11/008 |
| | | | | 416/90 R |
| 2015/0107109 | A1 | 4/2015 | Corsmeier et al. | |
| 2015/0204447 | A1 | 7/2015 | Kloepfer | |
| 2015/0260404 | A1 | 9/2015 | Sullivan | |
| 2015/0292402 | A1 * | 10/2015 | Razak | F02C 6/003 |
| | | | | 60/774 |
| 2016/0001873 | A1 | 1/2016 | Schwarz | |
| 2016/0102574 | A1 | 4/2016 | Peters | |
| 2016/0123172 | A1 | 5/2016 | Mondal et al. | |
| 2016/0123187 | A1 | 5/2016 | Leslie et al. | |
| 2016/0131084 | A1 | 5/2016 | Kupratis et al. | |
| 2016/0201515 | A1 | 7/2016 | Chang | |
| 2016/0208700 | A1 | 7/2016 | Minnear et al. | |
| 2016/0265430 | A1 | 9/2016 | Schwarz | |
| 2017/0234134 | A1 * | 8/2017 | Bunker | F01D 5/141 |
| | | | | 415/208.2 |

FOREIGN PATENT DOCUMENTS

| | | |
|---|---|---|
| FR | 2825578 A1 | 12/2002 |
| FR | 2935465 A1 | 3/2010 |

OTHER PUBLICATIONS

International Search Report and Written Opinion issued in connection with corresponding PCT Application No. PCT/US2017/064799 dated Mar. 16, 2018.

"Numerical Simulation of Integrated Performance of Turbine-based Combined Cycle Engine", Fan Jing, Chinese Doctoral Dissertations and Master's Theses Full-text Database (Master), Engineering Science and Technology II, Issue No. 3, Engineering Science and Technology collection II, 2006, Issue 3, pp. 6-19.

* cited by examiner

COOL CORE GAS TURBINE ENGINE

FIELD

The present subject matter relates generally to a gas turbine engine, or more particularly to a gas turbine engine configured to operate in a more efficient manner.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

The turbine section may generally include a high pressure turbine located immediately downstream from the combustion section. The high pressure turbine may include various stages of stationary turbine nozzles and rotating turbine rotor blades. Given a proximity of these stages of turbine nozzles and rotor blades to the combustion section, these components may be exposed to relatively high temperatures during operation of the gas turbine engine. Accordingly, in order to maintain a temperature of these components within a safe operating range, the gas turbine engine typically bleeds off an amount of air from the compressor section and provides such air to the components of the HP turbine as a cooling airflow. The components may typically include an internal cavity that receives the cooling airflow and one or more cooling holes through an outer wall to provide the cooling airflow to a surface of such components.

However, bleeding air from the compressor section to provide such cooling airflow to the turbine section may result in a less efficient gas turbine engine. Accordingly, the inventors of the present disclosure have discovered that a more efficient gas turbine engine capable of operating while maintaining a temperature of the turbine components within a desired operating temperature range with minimal or no airfoil cooling would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a compressor section defining a compressor exit temperature, T3, a combustion section located downstream of the compressor section, and a turbine section located downstream of the combustion section and defining a turbine inlet temperature, T4. A ratio, T4:T3, of the turbine inlet temperature, T4, to compressor exit temperature, T3, during operation of the gas turbine engine at a rated speed is less than or equal to 1.85.

In an exemplary aspect of the present disclosure, a method of operating a gas turbine engine is provided. The gas turbine engine includes a compressor section, a combustion section, and a turbine section in series flow order. The method includes operating the gas turbine engine at a rated speed such that the turbine section defines a turbine inlet temperature, T4, the compressor section defines a compressor exit temperature, T3, and the gas turbine engine defines a ratio, T4:T3, of the turbine inlet temperature, T4, to compressor exit temperature, T3, less than or equal to 1.85.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
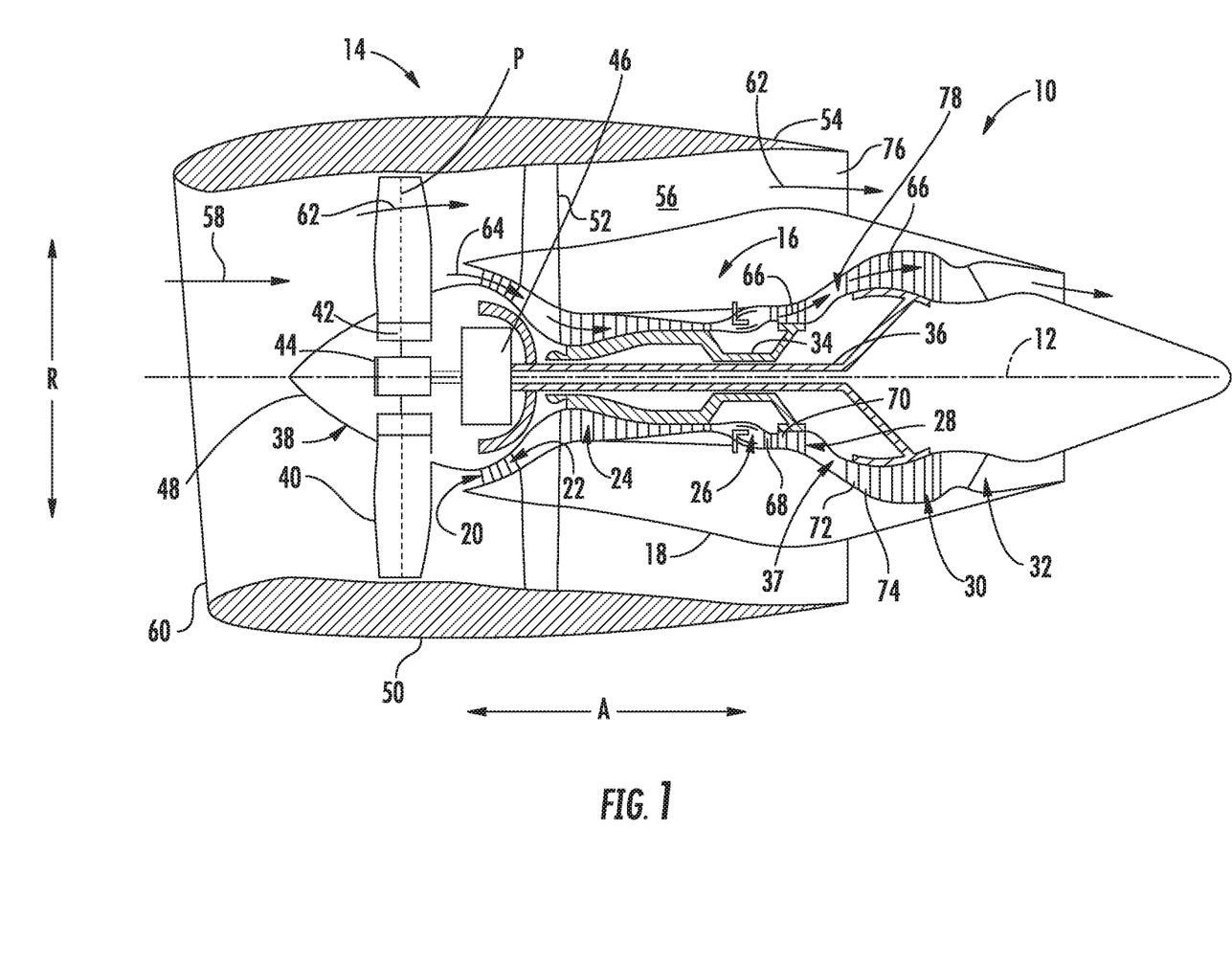
FIG. 1 is a schematic cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is an aeronautical, high-bypass turbofan jet engine 10, referred to herein as "turbofan engine 10", configured to be mounted to an aircraft, such as in an under-wing configuration or tail-mounted configuration. As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and jet exhaust nozzle section 32 together define a core air flowpath 37 through the core turbine engine 16.

Referring still the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. Moreover, for the embodiment depicted, the nacelle 50 is supported relative to the core turbine engine 16 by a plurality of circumferentially-spaced outlet guide vanes 52. Further, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26.

More specifically, the compressor section, including the LP compressor 22 and HP compressor 24, defines an overall pressure ratio during operation of the turbofan engine 10 at a rated speed. The overall pressure ratio refers to a ratio of an exit pressure of the compressor section (i.e., a pressure of the second portion of air 64 at an aft end of the compressor section) to an inlet pressure of the compressor section (i.e., a pressure of the second portion of air 64 at the inlet 20 to the compressor section). Additionally, the term "rated speed" with reference to the turbofan engine 10 refers to a maximum rotational speed that the turbofan engine 10 may achieve while operating properly. For example, the turbofan engine 10 may be operating at the rated speed during maximum load operations, such as during takeoff operations. For the embodiment depicted, the compressor section defines a relatively large overall pressure ratio during operation of the turbofan engine 10 at the rated speed. For example, the compressor section of the exemplary turbofan engine 10 depicted in FIG. 1 may define an overall pressure ratio greater than or equal to twenty-five (25) during operation of the turbofan engine 10 at the rated speed.

Referring still to FIG. 1, the compressed second portion of air 64 from the compressor section mixes with fuel and is burned within the combustion section to provide combustion gases 66. The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that the exemplary turbofan engine 10 depicted in FIG. 1 is a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least about 20,000 pounds of thrust, such as at least about 25,000 pounds of thrust, such as at least about 30,000 pounds of thrust. Accordingly, the turbofan engine 10 depicted in FIG. 1 may be referred to as a relatively large power class gas turbine engine.

Moreover, it should be appreciated that the exemplary turbofan engine 10 depicted in FIG. 1 is by way of example only, and that in other exemplary embodiments, the turbofan engine 10 may have any other suitable configuration. Additionally, or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as a power generation gas turbine engine, or any aeroderivative gas turbine engine, such as a nautical gas turbine engine.

Figure 2:
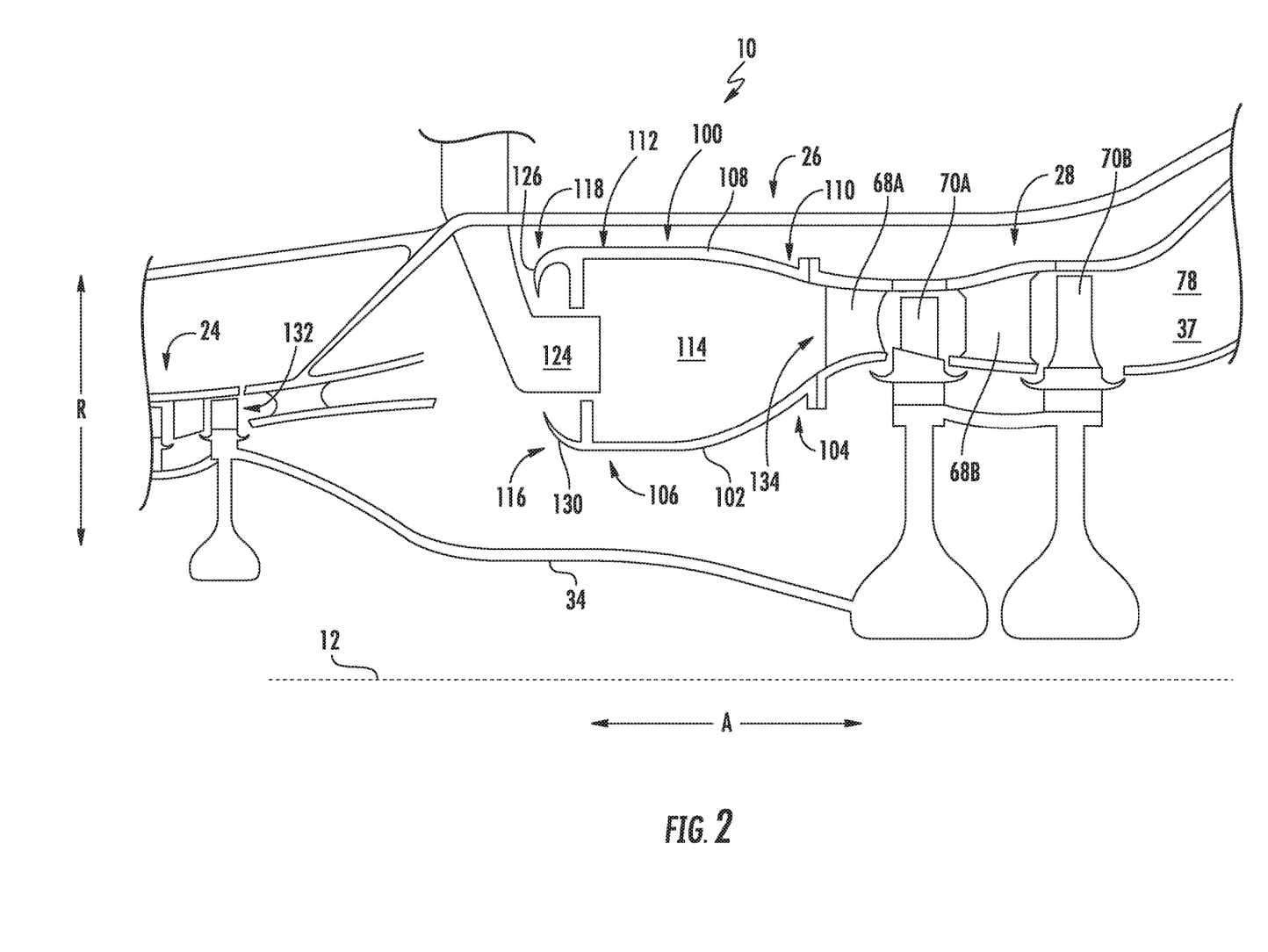
FIG. 2 is a schematic, cross-sectional view of a combustor assembly and a portion of a turbine section, including a component assembly, in accordance with an exemplary embodiment of the present disclosure.

Referring now to FIG. 2, a close-up view of a portion of the exemplary turbofan engine 10 of FIG. 1 is provided. More specifically, FIG. 2 provides a close-up view of an aft end of the HP compressor 24 of the compressor section, the combustion section 26, and the HP turbine 28 of the turbine section.

As shown, combustion section 26 includes a combustor assembly 100. The combustor assembly 100 generally includes an inner liner 102 extending between an aft end 104 and a forward end 106 generally along the axial direction A, as well as an outer liner 108 also extending between an aft end 110 and a forward end 112 generally along the axial direction A. The inner and outer liners 102, 108 together at least partially define a combustion chamber 114 therebetween. The inner and outer liners 102, 108 are each attached to or formed integrally with an annular dome. More particularly, the annular dome includes an inner dome section 116 formed integrally with the forward end 106 of the inner liner 102 and an outer dome section 118 formed generally with the forward end 112 of the outer liner 108. Further, the inner and outer dome section 116, 118 may each be formed integrally (or alternatively may be formed of a plurality of components attached in any suitable manner) and may each extend along the circumferential direction C to define an annular shape. It should be appreciated, however, that in other embodiments, the combustor assembly 100 may not include the inner and/or outer dome sections 116, 118; may include separately formed inner and/or outer dome sections 116, 118 attached to the respective inner liner 102 and outer liner 108; or may have any other suitable configuration.

Referring still to FIG. 2, the combustor assembly 100 further includes a plurality of fuel air mixers 124 spaced along the circumferential direction C (not shown) and positioned at least partially within the annular dome. More particularly, the plurality of fuel air mixers 124 are disposed at least partially between the outer dome section 118 and the inner dome section 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer dome sections 116, 118 are configured to assist in providing such a flow of compressed air from the compressor section into or through the fuel air mixers 124. For example, the outer dome section 118 includes an outer cowl 126 at a forward end and the inner dome section 116 similarly includes an inner cowl 130 at a forward end. The outer cowl 126 and inner cowl 130 may assist in directing the flow of compressed air from the compressor section 26 into or through one or more of the fuel air mixers 124. Again, however, in other embodiments, the annular dome may be configured in any other suitable manner.

For the embodiment depicted, the inner liner 102 and the outer liner 108 are each formed of a ceramic matrix composite (CMC) material, which is a non-metallic material having high temperature capability. Exemplary CMC materials utilized for such components may include silicon carbide (SiC), silicon nitride, or alumina matrix materials and combinations thereof. Ceramic fibers may be embedded within the matrix, such as oxidation stable reinforcing fibers including monofilaments like sapphire and silicon carbide (e.g., Textron's SCS-6), as well as roving and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophillite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape. Additionally, or alternatively, the CMC material may be formed in any other suitable manner or using any other suitable materials.

Referring still to FIG. 2, and as is discussed above, the combustion gases 66 flow from the combustion chamber 114 into and through the turbine section of the turbofan engine 10, where a portion of thermal and/or kinetic energy from the combustion gases 66 is extracted via sequential stages of turbine stator vanes and turbine rotor blades within the HP turbine 28 and LP turbine 30. More specifically, as is depicted in FIG. 2, combustion gases 66 from the combustion chamber 114 flow into the HP turbine 28, located immediately downstream of the combustion chamber 114, where thermal and/or kinetic energy from the combustion gases 66 is extracted via sequential stages of HP turbine stator vanes 68 and HP turbine rotor blades 70.

As is also discussed above with reference to FIG. 1, the HP turbine 28 is coupled to the HP compressor 24 via the HP shaft 34. Accordingly, rotation of the plurality of stages of HP turbine rotor blades 70 correspondingly rotates a plurality of stages of HP compressor rotor blades 80.

The exemplary turbofan engine 10 of FIG. 2 is configured to be operated in order to maintain a temperature of the HP turbine 28 below a maximum operating temperature for the various components therein, without requiring cooling of such components. For example, for the embodiment depicted, the compressor section of the turbofan engine 10 defines a compressor exit temperature, T3, and the turbine section of the turbofan engine 10 defines a turbine inlet temperature, T4. The compressor exit temperature, T3, refers to a temperature of an airflow at a downstream end, or an exit location 132 of the compressor section. Additionally, the turbine inlet temperature, T4, refers to a temperature of an airflow (such as the combustion gases 66) at an inlet 134 to the turbine section (i.e., for the embodiment depicted, the inlet 134 is to the HP turbine 28).

Particularly, for the exemplary embodiment depicted, the turbofan engine 10 defines a ratio, T4:T3, of the turbine inlet temperature, T4, to compressor exit temperature, T3, during operation of the turbofan engine at the rated speed that is less than or equal to 1.85. For example, in certain exemplary embodiments of the present disclosure, the ratio, T4:T3, of the turbine inlet temperature, T4, to compressor exit temperature, T3, during operation of the turbofan engine at the rated speed may be greater than or equal to 1.5 and less than or equal to 1.8. Further, it should be appreciated, that the above ratio, T4:T3, may hold true during operation of the turbofan engine 10 at the rated speed, wherein the compressor exit temperature, T3, is greater than about 1,200 degrees Rankine and less than about 2,000 degrees Rankine. Additionally, it should be appreciated that for the purposes of defining the ratio, T4:T3, both the turbine inlet temperature, T4, and the compressor exit temperature, T3, are defined in an absolute scale, such as in degrees Rankine or degrees Kelvin.

Figure 3:
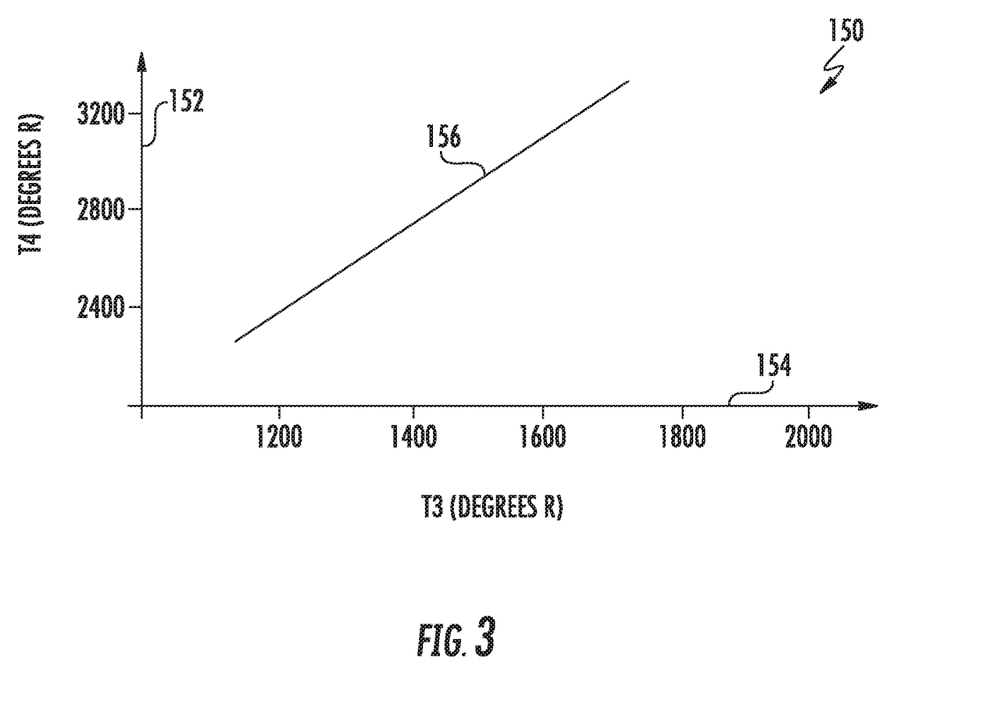
FIG. 3 is graph depicting a relationship between a turbine inlet temperature, T4, and a compressor exit temperature for the exemplary gas turbine engine of FIGS. 1 and 2.

More particularly still, referring briefly to FIG. 3, a graph 150 is provided depicting a relationship between the turbine inlet temperature, T4, on that a Y-axis 152 in degrees Rankine, and the compressor exit temperature, T3, on an X-axis 154 in degrees Rankine, for the exemplary turbofan engine 10 of FIGS. 1 and 2. More specifically, the graph 150 of FIG. 3 depicts a line 156 indicating a T4 to T3 relationship wherein cooling of the various components of the turbine section of the turbofan engine 10 has been determined by the inventors of the present disclosure to be particularly necessary. However, as described above, the turbofan engine 10 of FIGS. 1 and 2 has been designed, and is operated, such that a minimal amount of cooling or no amount of cooling is required for the turbine section. Accordingly, for the exemplary turbofan engine 10 depicted in FIGS. 1 and 2, the turbine inlet temperature, T4, in degrees Rankine is about five percent (5%) less than a value determined by the line 156. More particularly, the relationship of turbine inlet temperature, T4, in degrees Rankine to compressor exit temperature, T3, in degrees Rankine represented by the line 156 is as follows: 1.88×T3+101 degrees Rankine, where T3 is the compressor exit temperature. Accordingly, for the exemplary turbofan engine 10 depicted in FIGS. 1 and 2, the turbine inlet temperature T4 in degrees Rankine is about five percent (5%) less than the value determined by: 1.88×T3+101 degrees Rankine. For example, in certain exemplary embodiments, the turbine inlet temperature, T4, in degrees Rankine may be about ten percent (10%) less than the value determined by: 1.88×T3+101 degrees Rankine.

Moreover, referring back to FIG. 2, the HP turbine 28 depicted includes a plurality of first stage turbine nozzles/stator vanes 68A and a plurality of second stage turbine nozzles/stator vanes 68B located downstream from the first stage turbine nozzles 68A. Additionally, the HP turbine 28 depicted includes a plurality of first stage turbine rotor blades 70A located between the first stage turbine nozzles 68A and the second stage turbine nozzles 68B, and a plurality of second stage turbine rotor blades 70B located downstream of the second stage turbine nozzles 68B.

Figure 4:
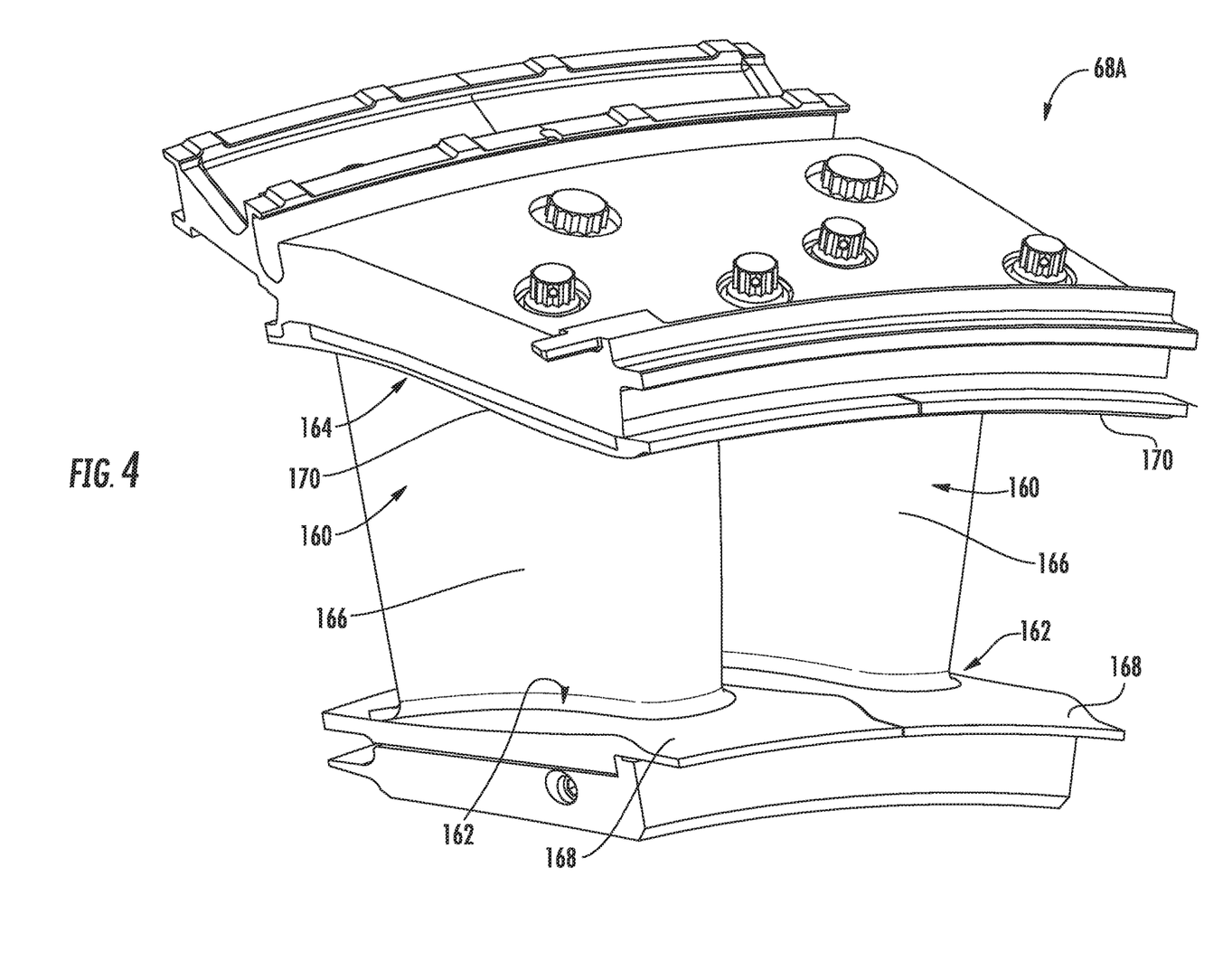
FIG. 4 is a forward, perspective view of a plurality of first stage turbine nozzles in accordance with an exemplary embodiment of the present disclosure.

Referring now also to FIG. 4, a perspective view of a forward end of a section of the first stage turbine nozzles 68A is depicted. As shown, each of the first stage turbine nozzles 68A include a blade 160 extending from a root 162 to a tip 164 and formed of a wall 166. The blade 160 is attached to or formed integrally with an inner base member 168 at the root 162 and is attached to or formed integrally with an outer base member 170 at the tip 164. As is depicted, the wall 166 of the blade 160 of each of the first stage turbine nozzles 68A is exposed to the core air flowpath 37 within the HP turbine 28 of the turbine section and is configured as a continuous, non-permeable wall 166 to prevent an airflow through the wall 166. Notably, the wall 166 of each blade 160 makes up an entirety of a portion of the blade 160 exposed to the core air flowpath 37. Accordingly, the entirety of each of the blades 160 of the first stage turbine nozzles are configured without any cooling holes defined therein, such that the continuous, non-permeable walls 166 do not provide any film cooling air for the blades 160. Such a configuration is allowable due to the relationship of compressor exit temperature, T3, to turbine inlet temperature, T4, described above, and further may be possible due to formation of the blades 160 of the first stage turbine nozzles 68A of a high temperature material. For example, in at least certain exemplary embodiments, the blades 160 of each of the first stage turbine nozzles 68A, as well as the inner and outer base members 168, 170, may be formed of a refractory material, such as a ceramic matrix composite material.

It will be appreciated, that the second stage turbine nozzles 68B may be configured in substantially the same manner as the first stage turbine nozzles 68A. For example, each of the second stage turbine nozzles 68B may also include a blade extending from a root to a tip and formed of a wall. The wall of the blade of each of the second stage turbine nozzles 68B may also be exposed to the core air flowpath 37 within the HP turbine 28 of the turbine section and may be configured as a continuous, non-permeable wall to prevent an air flow through the wall. Additionally, the wall of each blade of the second stage turbine nozzles 68B may also make up an entirety of a portion of the blade exposed to the core air flowpath 37. Further, the blades of each of the second stage turbine nozzles 68B may also be formed of a refractory material, such as a ceramic matrix composite material.

Figure 5:
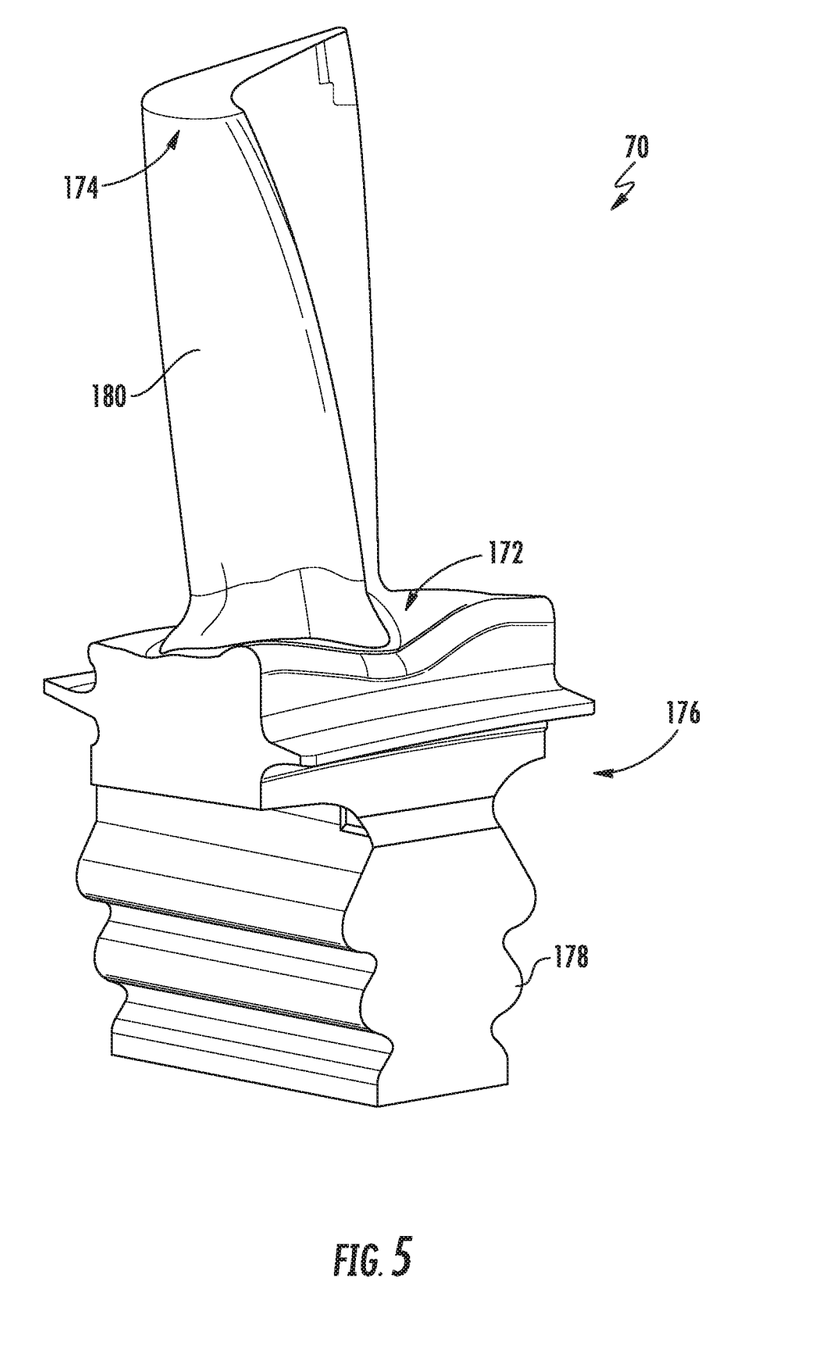
FIG. 5 is a perspective view of a turbine rotor blade in accordance with an exemplary embodiment of the present disclosure

Moreover, referring now to FIG. 5, a perspective view is provided of a turbine rotor blade 70 in accordance with an exemplary embodiment of the present disclosure. The exemplary turbine rotor blade of FIG. 5 may be one of the plurality of first stage turbine rotor blades 70A, or alternatively one of the plurality of second stage turbine rotor blades 70B. As is depicted, the exemplary turbine rotor blade 70 depicted extends from a root 172 to a tip 174. The turbine rotor blade 70 is attached at the root 172 to a base 176, the base 176 including a dovetail portion 178 which is configured to connect to a rotor disk (not labeled; see FIG. 2). Additionally, the turbine rotor blade 70 of FIG. 5 is formed of a wall 180, and the wall 180 is exposed to the core air flowpath 37 within the HP turbine 28 of the turbine section of the turbofan engine 10. Similar to the exemplary first and second stage turbine nozzles 68A, 68B, the wall 180 forming the exemplary turbine rotor blade 70 of FIG. 5 is configured as a continuous, non-permeable wall to prevent an air flow therethrough. Additionally, the wall 180 of the turbine rotor blade 70 of FIG. 5 makes up an entirety of a portion of the rotor blade 70 exposed to the core air flowpath 37. Moreover, the rotor blade 70 may be formed of a refractory material, such as a ceramic matrix composite material, such that the rotor blade is capable of withstanding relatively high temperatures present within, e.g. the HP turbine 28 of the turbine section.

It should be appreciated, however, that in other exemplary embodiments of the present disclosure, one or more of the turbine nozzles 68 and/or turbine rotor blades 70 may be formed of a less temperature capable material (such as a metal). In such cases the walls forming the blades of the turbine nozzles 68 and rotor blades 70 may include some film cooling holes, and thus may not be configured as continuous, non-permeable walls. However, given the ratio T4:T3, of the turbine inlet temperature, T4, to compressor exit temperature, T3, a relatively low amount of cooling flow would be required.

Figure 6:
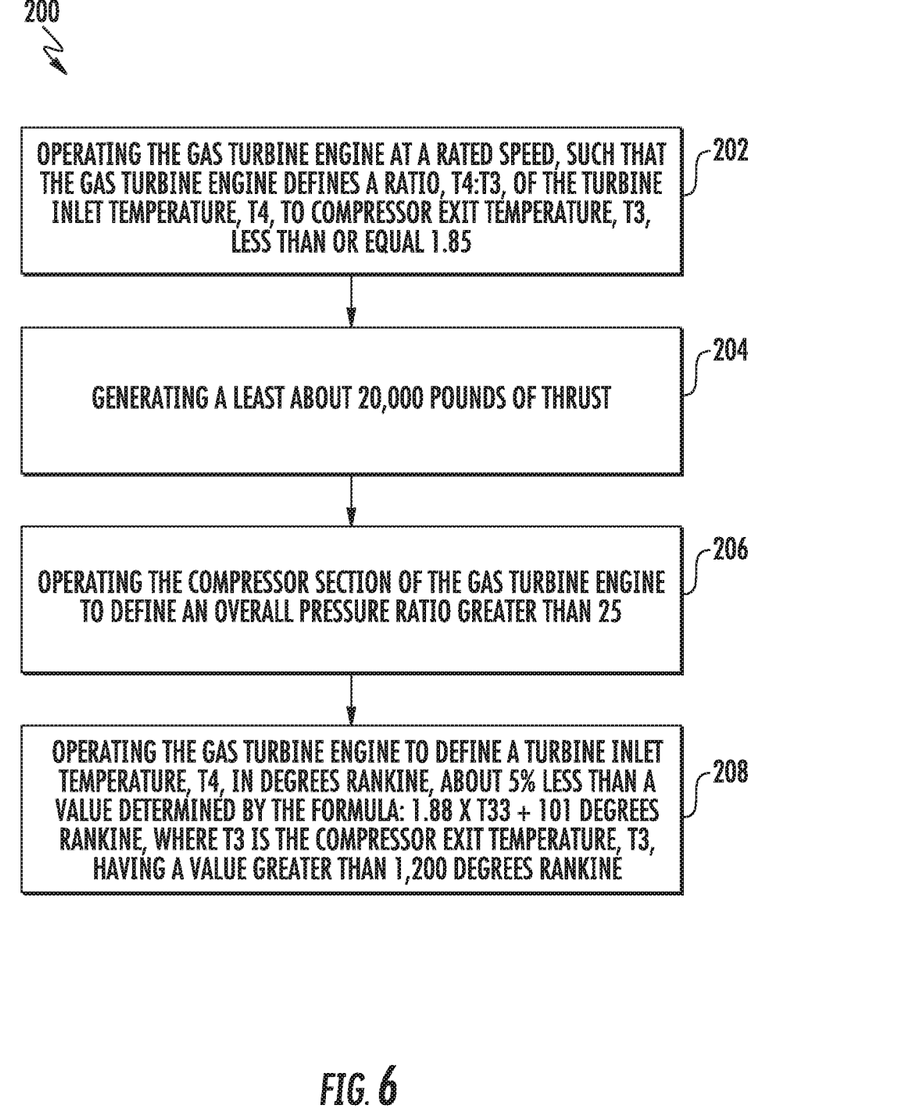
FIG. 6 is a flow diagram of a method for operating a gas turbine engine in accordance with an exemplary aspect of the present disclosure.

Referring now to FIG. 6, a flow diagram is provided of a method (200) of operating a gas turbine engine in accordance with an exemplary aspect of the present disclosure. In certain exemplary embodiments, the gas turbine engine may be configured in substantially the same manner as the exemplary turbofan engine described above with reference to FIGS. 1 through 5. Accordingly, the gas turbine engine may include a compressor section defining a compressor exit temperature, T3, a combustion section, and a turbine section defining a turbine inlet temperature, T4, each in series flow order.

The exemplary method (200) includes at (202) operating the gas turbine engine at a rated speed, such that the gas turbine engine defines a ratio, T4:T3, of the turbine inlet temperature, T4, to compressor exit temperature, T3, less than or equal to 1.85. Additionally, in certain exemplary aspects, operating the gas turbine engine at the rated speed at (202) may include at (204) generating at least about 20,000 pounds of thrust, and at (206) operating the compressor section of the gas turbine engine to define an overall pressure ratio greater than 25.

Furthermore, for the exemplary aspect depicted, operating the gas turbine engine at the rated speed at (202) includes at (208) operating the gas turbine engine to define a turbine inlet temperature, T4, in degrees Rankine, about 5% less than a value determined by the formula: 1.88×T3+101 degrees Rankine, where T3 is the compressor exit temperature, T3, having a value greater than 1,200 degrees Rankine.

From the disclosure herein, it should be appreciated that the exemplary gas turbine engine described operates contrary to conventional teachings. Specifically, conventional engine operation teachings generally attempt to maximize a ratio of the turbine inlet temperature T4 to compressor exit temperature T3, in an attempt to generate a maximum amount of energy from the compressed air available. However, the engine described herein operates contrary to these teachings by reducing the ratio of the turbine inlet temperature, T4, to compressor exit temperature, T3, such that little or no cooling air is required to be taken from the compressor section for cooling the turbine section. The inventors of the present disclosure have discovered that such a configuration may result in a net increase in efficiency, despite the reduction in turbine inlet temperature, T4, relative to compressor exit temperature, T3.

Accordingly, a gas turbine engine configured in accordance with one or more the exemplary embodiments described herein, or operated in accordance with one or more the exemplary aspects described herein, may provide for a more efficient and more efficiently operated gas turbine engine. More specifically, the exemplary gas turbine engine described herein may allow for the various turbine components to be uncooled, or minimally cooled, such that little or no air must be siphoned off or bled from the compressor section during operation of the gas turbine engine, resulting in significant cycle benefits.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
a compressor section defining a compressor exit temperature, T3;
a combustion section located downstream of the compressor section; and
a turbine section located downstream of the combustion section and defining a turbine inlet temperature, T4, wherein a ratio, T4:T3, of the turbine inlet temperature, T4, to compressor exit temperature, T3, during operation of the gas turbine engine at a rated speed is less than or equal to 1.85;
wherein the compressor section, combustion section, and turbine section together define a core air flowpath, wherein the turbine section comprises a first turbine located immediately downstream from the combustion section, wherein the first turbine comprises a plurality of first stage turbine rotor blades, wherein each of the first stage turbine rotor blades extend from a root to a tip and are formed of a wall, wherein the wall of each first stage turbine rotor blade is exposed to the core air flowpath within the turbine section and is configured as a continuous, non-permeable wall to prevent an airflow therethrough such that the first stage turbine rotor blade is an uncooled component.

2. The gas turbine engine of claim 1, wherein the compressor exit temperature, T3, is greater than about 1,200 degrees Rankine and less than about 2,000 degrees Rankine.

3. The gas turbine engine of claim 1, wherein the ratio, T4:T3, of the turbine inlet temperature, T4, to compressor exit temperature, T3, during operation of the gas turbine engine at the rated speed is greater than or equal to 1.5 and less than or equal to 1.8.

4. The gas turbine engine of claim 1, wherein the compressor section further defines an overall pressure ratio greater than or equal to 25 during operation of the gas turbine engine at the rated speed.

5. The gas turbine engine of claim 1, wherein the turbine inlet temperature, T4, in degrees Rankine is at least about five percent (5%) less than a value determined by the formula: 1.88×T3+101 degrees Rankine, wherein T3 is the compressor exit temperature, T3, having a value greater than 1,200 degrees Rankine.

6. The gas turbine engine of claim 1, wherein the walls forming the first stage turbine rotor blades are each formed of a refractory material, wherein the gas turbine engine is configured to generate at least about 20,000 pounds of thrust during operation at the rated speed, and wherein the gas turbine engine is configured as an aeronautical turbofan engine.

7. A method of operating a gas turbine engine comprising a compressor section, a combustion section, and a turbine section in series flow order, the method comprising:
operating the gas turbine engine at a rated speed such that the turbine section defines a turbine inlet temperature, T4, the compressor section defines a compressor exit temperature, T3, and the gas turbine engine defines a ratio, T4:T3, of the turbine inlet temperature, T4, to compressor exit temperature, T3, less than or equal to 1.85;
wherein the compressor section, combustion section, and turbine section together define a core air flowpath, wherein the turbine section comprises a first turbine located immediately downstream from the combustion section, wherein the first turbine comprises a plurality of first stage turbine rotor blades, wherein each of the first stage turbine rotor blades extend from a root to a tip and are formed of a wall, wherein the wall of each first stage turbine rotor blade is exposed to the core air flowpath within the turbine section and is configured as a continuous, non-permeable wall to prevent an airflow therethrough such that the first stage turbine rotor blade is an uncooled component.

8. The method of claim 7, wherein the compressor exit temperature, T3, is greater than about 1,200 degrees Rankine and less than about 2,000 degrees Rankine.

9. The method of claim 7, wherein operating the gas turbine engine at the rated speed comprises operating the compressor section of the gas turbine engine to define an overall pressure ratio greater than or equal to 25.

10. The method of claim 7, wherein operating the gas turbine engine at the rated speed comprises operating the gas turbine engine to define a turbine inlet temperature, T4, in degrees Rankine, less than about five percent (5%) of a value determined by the formula: 1.88×T3+101 degrees Rankine, wherein T3 is the compressor exit temperature, T3, having a value greater than 1,200 degrees Rankine.

11. The method of claim 7, wherein operating the gas turbine engine at the rated speed comprises operating the gas turbine engine to define a turbine inlet temperature, T4, in degrees Rankine, about ten percent (10%) less than a value determined by the formula: 1.88×T3+101 degrees Rankine, wherein T3 is the compressor exit temperature, T3, having a value greater than 1,200 degrees Rankine.

12. The method of claim 7, wherein the walls forming the first stage turbine rotor blades are each formed of a refractory material, wherein the gas turbine engine is configured to generate at least about 20,000 pounds of thrust during operation at the rated speed, and wherein the gas turbine engine is configured as an aeronautical turbofan engine.

13. A gas turbine engine comprising:
a compressor section defining a compressor exit temperature, T3;
a combustion section located downstream of the compressor section; and
a turbine section located downstream of the combustion section and defining a turbine inlet temperature, T4, wherein a ratio, T4:T3, of the turbine inlet temperature, T4, to compressor exit temperature, T3, during operation of the gas turbine engine at a rated speed is less than or equal to 1.85;
wherein the compressor section, combustion section, and turbine section together define a core air flowpath, wherein the turbine section comprises a first turbine located immediately downstream from the combustion section, wherein the first turbine comprises a plurality of first stage turbine nozzles, wherein each of the first stage turbine nozzles extend from a root to a tip and are formed of a wall, wherein the wall of each first stage turbine nozzle is exposed to the core air flowpath within the turbine section and is configured as a continuous, non-permeable wall to prevent an airflow therethrough such that the first stage turbine nozzle is an uncooled component.

14. The gas turbine engine of claim 13, wherein the compressor exit temperature, T3, is greater than about 1,200 degrees Rankine and less than about 2,000 degrees Rankine.

15. The gas turbine engine of claim 13, wherein the compressor section further defines an overall pressure ratio greater than or equal to 25 during operation of the gas turbine engine at the rated speed.

16. The gas turbine engine of claim 13, wherein the turbine inlet temperature, T4, in degrees Rankine is at least about five percent (5%) less than a value determined by the formula: 1.88×T3+101 degrees Rankine, wherein T3 is the compressor exit temperature, T3, having a value greater than 1,200 degrees Rankine.

17. The gas turbine engine of claim 13, wherein each of the first stage turbine nozzles is configured without any cooling holes defined there.

18. The gas turbine engine of claim 13, wherein the walls forming the first stage turbine nozzles are each formed of a refractory material, wherein the gas turbine engine is configured to generate at least about 20,000 pounds of thrust during operation at the rated speed, and wherein the gas turbine engine is configured as an aeronautical turbofan engine.

* * * * *